United States Patent
Fridin et al.

(10) Patent No.: US 11,215,460 B2
(45) Date of Patent: Jan. 4, 2022

(54) METHOD AND APPARATUS FOR MAP-BASED DYNAMIC LOCATION SAMPLING

(71) Applicant: HERE GLOBAL B.V., Eindhoven (NL)

(72) Inventors: Marina Ousov Fridin, Kfar Sava (IL); Daniel Schmidt, Raanana (IL); Yelena Shnaider, Givatayim (IL); Inna Branevich, Chicago, IL (US); Alexander Maryanovsky, Lezion (IL); Marcelo Savignano, Berlin (DE)

(73) Assignee: HERE Global B.V., Eindhoven (NL)

(*) Notice: Subject to any disclaimer, the term of this patent is extended or adjusted under 35 U.S.C. 154(b) by 199 days.

(21) Appl. No.: 16/264,093

(22) Filed: Jan. 31, 2019

(65) Prior Publication Data
US 2020/0249028 A1    Aug. 6, 2020

(51) Int. Cl.
*G01C 21/30* (2006.01)
*G01C 21/34* (2006.01)
*G08G 1/01* (2006.01)

(52) U.S. Cl.
CPC ......... *G01C 21/30* (2013.01); *G01C 21/3492* (2013.01); *G08G 1/0129* (2013.01)

(58) Field of Classification Search
CPC .... G01C 21/30; G01C 21/3492; G01C 21/32; G08G 1/0129
See application file for complete search history.

(56) References Cited

U.S. PATENT DOCUMENTS

| 7,142,979 B1 | 11/2006 | Shonk | |
| 7,359,713 B1* | 4/2008 | Tiwari | G01S 19/34 455/456.1 |
| 9,161,172 B2 | 10/2015 | Poduri et al. | |
| 9,191,442 B2 | 11/2015 | Kuntagod et al. | |
| 2003/0114983 A1* | 6/2003 | Irvin | G01S 19/21 701/473 |
| 2007/0008184 A1* | 1/2007 | Ho | G08G 1/015 340/941 |
| 2007/0027583 A1* | 2/2007 | Tamir | G08G 1/164 701/1 |

(Continued)

FOREIGN PATENT DOCUMENTS

CN    105444774 A    3/2016

OTHER PUBLICATIONS

Office Action for related European Patent Application No. 20154713.0-1001, dated Jun. 26, 2020, 48 pages.

(Continued)

*Primary Examiner* — Rami Khatib
*Assistant Examiner* — G. J. L.
(74) *Attorney, Agent, or Firm* — Ditthavong, Steiner & Mlotkowski

(57) ABSTRACT

An approach is provided for map-based dynamic location sampling. The approach, for instance, involves calculating an estimated time of arrival at an end node of a road segment from a beginning node of the road segment based on historical traversal time data for the road segment. The approach also involves determining a sampling rate for a location sensor of a vehicle traveling the road segment based on the estimated time of arrival. The approach further involves configuring the location sensor to collect location data using the sampling rate.

17 Claims, 16 Drawing Sheets

(56) References Cited

U.S. PATENT DOCUMENTS

| | | | |
|---|---|---|---|
| 2007/0185645 A1* | 8/2007 | Chao | G08G 1/0104 |
| | | | 701/533 |
| 2007/0208492 A1* | 9/2007 | Downs | G08G 1/0104 |
| | | | 701/117 |
| 2008/0071465 A1* | 3/2008 | Chapman | G01C 21/3691 |
| | | | 701/117 |
| 2009/0005958 A1* | 1/2009 | Roesser | G08G 1/20 |
| | | | 701/117 |
| 2010/0323722 A1* | 12/2010 | Hatami | G01C 21/3438 |
| | | | 455/456.3 |
| 2013/0113655 A1* | 5/2013 | Shen | H04W 4/023 |
| | | | 342/357.31 |
| 2013/0245880 A1 | 9/2013 | Mcquade | |
| 2015/0057930 A1* | 2/2015 | Kolar | G01C 21/00 |
| | | | 701/532 |
| 2015/0094941 A1* | 4/2015 | Chapman | G08G 1/0104 |
| | | | 701/119 |
| 2015/0312863 A1* | 10/2015 | Shen | G01C 21/3697 |
| | | | 455/574 |
| 2018/0018835 A1 | 1/2018 | Raviv et al. | |
| 2018/0184395 A1 | 6/2018 | Macfarlane et al. | |
| 2020/0284594 A1* | 9/2020 | Wang | G01C 21/3691 |

OTHER PUBLICATIONS

Liu et al., "An Analysis of the Cost Efficiency of Probe Vehicle Data at Different Transmission Frequencies", International Journal of ITS Research, vol. 4, No. 1, Dec. 2006, pp. 21-28.

Office Action for related European Patent Application No. 20154713. 0-1001/3690402, dated Sep. 1, 2020, 14 pages.

Langley, "The Integrity of GPS", www.gpsworld.com, Mar. 1999, pp. 60-63.

Li et al., "Navigation Performance Using Long-Term Ephemeris Extension for Mobile Device", Proceedings of the 26th International Technical Meeting of the ION Satellite Division, ION GNSS+ 2013, Sep. 16-20, 2013, pp. 1642-1651.

* cited by examiner

METHOD AND APPARATUS FOR MAP-BASED DYNAMIC LOCATION SAMPLING

BACKGROUND

Service providers and device manufacturers are continually challenged to deliver value and convenience to consumers by, for example, providing compelling network services. For example, one area of development has focused on location-based services that rely on data captured from location sensors (e.g., Global Positioning System (GPS) or equivalent sensors) using mobile devices (e.g., smartphones). Usually these devices rely on fixed/timed-based intervals for sensing or providing their locations as the devices move around. However, determining a location generally requires use of battery resources to drive positioning sensors and to compute the location based on the sensor readings. Moreover, communication or transmission of this data can also require additional battery and/or network data resources. Accordingly, service providers and device manufacturers face significant technical challenges to providing efficient power saving schemes for a device and its sensors.

SOME EXAMPLE EMBODIMENTS

Therefore, there is a need for providing dynamic location sampling mechanisms to minimize power and/or resource consumption when collecting, processing, and/or transmitting sensor data particularly in resource constrained devices such as mobile devices or other battery-operated devices while maintaining functionality and accuracy.

According to one embodiment, a method comprises calculating an estimated time of arrival at an end node of a road segment from a beginning node of the road segment based on historical traversal time data for the road segment. The method also comprises determining a sampling rate for a location sensor of a vehicle traveling the road segment based on the estimated time of arrival. The method further comprises configuring the location sensor to collect location data using the sampling rate.

According to another embodiment, an apparatus comprises at least one processor, and at least one memory including computer program code for one or more computer programs, the at least one memory and the computer program code configured to, with the at least one processor, cause, at least in part, the apparatus to calculate an estimated time of arrival at an end node of a road segment from a beginning node of the road segment based on historical traversal time data for the road segment. The apparatus is also caused to determine a sampling rate for a location sensor of a vehicle traveling the road segment based on the estimated time of arrival. The apparatus is further caused to configure the location sensor to collect location data using the sampling rate.

According to another embodiment, a computer-readable storage medium carrying one or more sequences of one or more instructions which, when executed by one or more processors, cause, at least in part, an apparatus to calculate an estimated time of arrival at an end node of a road segment from a beginning node of the road segment based on historical traversal time data for the road segment. The apparatus is also caused to determine a sampling rate for a location sensor of a vehicle traveling the road segment based on the estimated time of arrival. The apparatus is further caused to configure the location sensor to collect location data using the sampling rate.

According to another embodiment, an apparatus comprises means for calculating an estimated time of arrival at an end node of a road segment from a beginning node of the road segment based on historical traversal time data for the road segment. The apparatus also comprises means for determining a sampling rate for a location sensor of a vehicle traveling the road segment based on the estimated time of arrival. The apparatus further comprises means for configuring the location sensor to collect location data using the sampling rate.

According to one embodiment, a method comprises initiating a capture of a current location of a vehicle on a road segment by a location sensor based on a keep-alive sampling rate. The location sensor, for instance, is configured to operate at a sampling rate that is reduced from a default sampling rate in addition to the keep-alive sampling rate. The method also comprises determining a predicted location of the vehicle based on an estimated time of arrival of the vehicle at an end node of the road segment. The estimated time of arrival is based on historical traversal time data for the road segment. The method further comprises reconfiguring the location sensor to operate at the default sampling frequency based on determining that the predicted location differs from the current location by more than a threshold distance.

According to another embodiment, an apparatus comprises at least one processor, and at least one memory including computer program code for one or more computer programs, the at least one memory and the computer program code configured to, with the at least one processor, cause, at least in part, the apparatus to initiate a capture of a current location of a vehicle on a road segment by a location sensor based on a keep-alive sampling rate. The location sensor, for instance, is configured to operate at a sampling rate that is reduced from a default sampling rate in addition to the keep-alive sampling rate. The apparatus is also caused to determine a predicted location of the vehicle based on an estimated time of arrival of the vehicle at an end node of the road segment. The estimated time of arrival is based on historical traversal time data for the road segment. The apparatus is further caused to reconfigure the location sensor to operate at the default sampling frequency based on determining that the predicted location differs from the current location by more than a threshold distance.

According to another embodiment, a computer-readable storage medium carrying one or more sequences of one or more instructions which, when executed by one or more processors, cause, at least in part, an apparatus to initiate a capture of a current location of a vehicle on a road segment by a location sensor based on a keep-alive sampling rate. The location sensor, for instance, is configured to operate at a sampling rate that is reduced from a default sampling rate in addition to the keep-alive sampling rate. The apparatus is also caused to determine a predicted location of the vehicle based on an estimated time of arrival of the vehicle at an end node of the road segment. The estimated time of arrival is based on historical traversal time data for the road segment. The apparatus is further caused to reconfigure the location sensor to operate at the default sampling frequency based on determining that the predicted location differs from the current location by more than a threshold distance.

According to another embodiment, an apparatus comprises means for initiating a capture of a current location of a vehicle on a road segment by a location sensor based on a keep-alive sampling rate. The location sensor, for instance, is configured to operate at a sampling rate that is reduced from a default sampling rate in addition to the keep-alive sampling rate. The apparatus also comprises means for determining a predicted location of the vehicle based on an estimated time of arrival of the vehicle at an end node of the road segment. The estimated time of arrival is based on historical traversal time data for the road segment. The apparatus further comprises means for reconfiguring the location sensor to operate at the default sampling frequency based on determining that the predicted location differs from the current location by more than a threshold distance.

According to one embodiment, a method comprises calculating an estimated time of arrival at an end node of a road segment from a beginning node of the road segment based on historical traversal time data for the road segment. The method also comprises determining a data transmission frequency for a transmitting device of a vehicle traveling the road segment based on the estimated time of arrival. The method further comprises configuring the transmitting device to transmit data from the vehicle at the data transmission frequency.

According to another embodiment, an apparatus comprises at least one processor, and at least one memory including computer program code for one or more computer programs, the at least one memory and the computer program code configured to, with the at least one processor, cause, at least in part, the apparatus to calculate an estimated time of arrival at an end node of a road segment from a beginning node of the road segment based on historical traversal time data for the road segment. The apparatus is also caused to determine a data transmission frequency for a transmitting device of a vehicle traveling the road segment based on the estimated time of arrival. The apparatus is further caused to configure the transmitting device to transmit data from the vehicle at the data transmission frequency.

According to another embodiment, a computer-readable storage medium carrying one or more sequences of one or more instructions which, when executed by one or more processors, cause, at least in part, an apparatus to calculate an estimated time of arrival at an end node of a road segment from a beginning node of the road segment based on historical traversal time data for the road segment. The apparatus is also caused to determine a data transmission frequency for a transmitting device of a vehicle traveling the road segment based on the estimated time of arrival. The apparatus is further caused to configure the transmitting device to transmit data from the vehicle at the data transmission frequency.

According to another embodiment, an apparatus comprises means for calculating an estimated time of arrival at an end node of a road segment from a beginning node of the road segment based on historical traversal time data for the road segment. The apparatus also comprises means for determining a data transmission frequency for a transmitting device of a vehicle traveling the road segment based on the estimated time of arrival. The apparatus further comprises means for configuring the transmitting device to transmit data from the vehicle at the data transmission frequency.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing map-based dynamic location sampling mechanisms, e.g., to minimize power consumption in a navigation system while allowing for various levels of functionality and accuracy. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
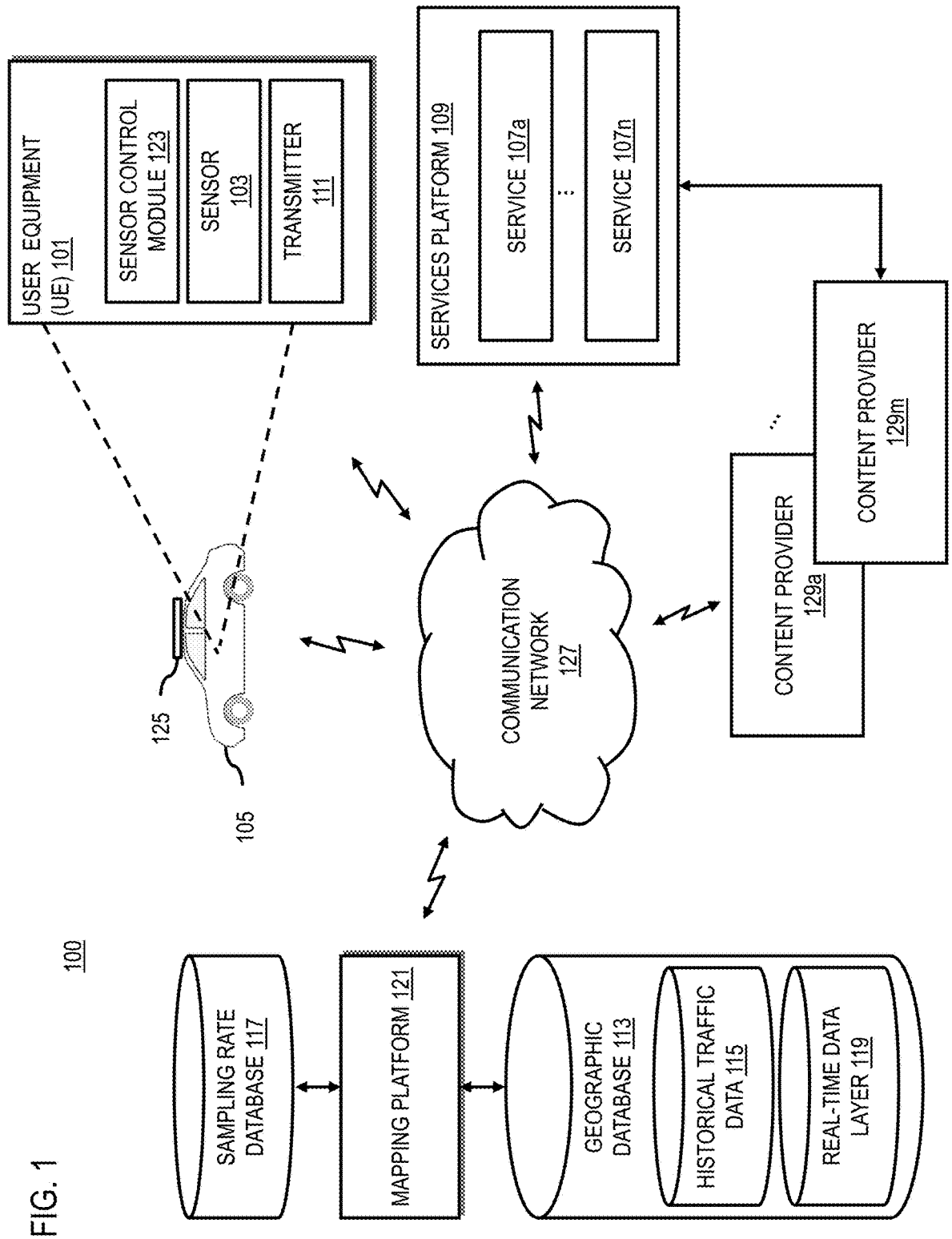
FIG. 1 is a diagram of a system capable of providing map-based dynamic location sampling, according to an embodiment.

FIG. 1 is a diagram of a system capable of providing map-based dynamic location sampling, according to an embodiment. Historically, location-based services (e.g., navigation services, mapping services, etc.) executing on power-constrained devices (e.g., battery powered smart-phones or other mobile devices such as user equipment (UE) 101) can often cause major battery drain problems, particularly during high frequency location sampling (e.g., using a location sensor 103 of the UE 101 such as Global Positioning System (GPS) location sensors or equivalent). For example, such high frequency location sampling can occur when the UE 101 executes a navigation application for routing. As noted above, each location sampling point can require battery power to activate the location sensor 103 to acquire, process, and/or transmit positioning data to determine geographic coordinates of the UE 101. When the UE 101 is used in a corresponding vehicle 105, the determined geographic coordinates or positioning data can also represent the location of the vehicle 105 when using location-based services (e.g., the services 107a-107n, also collectively referred to as services 107, of the services platform 109). As a result, high frequency location sampling of the UE 101 and/or vehicle 105 can quickly drain batteries or other resources (e.g., computational resources, bandwidth, memory, etc.). Service providers and device manufacturers, thus, face significant technical challenges to reducing resource usage caused by traditional high frequency sampling of sensor data.

Many traditional approaches have attempted to solve this problem by extrapolating accelerometer data (e.g., via a double integral over time). By way of example, this can be explained by the following expressions (assuming accelerometer noise is distributed normally $N_A \sim (\mu_A, \sigma_A)$):

$$a_{observed} = a_{true} + N_A$$

$$X_{interpolated} = \iint (a_{true} + N_A (dt))^2$$

$$X_{interpolated} = X_{true} + N_A t^2 + C_V t + C_x$$

As evident by the interpolated equation, a constant noise factor in accelerometer data is extrapolated to a quadratic error in distance over time. This is further explored by Table 1 as follows:

TABLE 1

| Angle Error (degrees) | Acceleration Error (m/s/s) | Velocity Error (m/s) at 10 seconds | Position Error (m) at 10 seconds | Position Error (m) at 1 minute | Position Error (m) at 10 minutes | Position Error (m) at 1 hour |
|---|---|---|---|---|---|---|
| 0.1 | 0.017 | 0.17 | 1.7 | 61.2 | 6120 | 220 e 3 |
| 0.5 | 0.086 | 0.86 | 8.6 | 309.6 | 30960 | 1.1 e 6 |
| 1.0 | 0.17 | 1.7 | 17 | 612 | 61200 | 2.2 e 6 |
| 1.5 | 0.256 | 2.56 | 25.6 | 921.6 | 92160 | 3.3 e 6 |
| 2.0 | 0.342 | 3.42 | 34.2 | 1231.2 | 123120 | 4.4 e 6 |
| 3.0 | 0.513 | 5.13 | 51.3 | 1846.8 | 184680 | 6.6 e 6 |
| 5.0 | 0.854 | 8.54 | 85.4 | 3074.4 | 307440 | 11 e 6 |

This error can make accelerometer-based position tracking practically impossible. Other methods involving Kalman Filters and/or Markov Models have attempted to solve these issues with using accelerometer data, but accelerometer-based position tracking generally remains less accurate than location tracking through more power-consuming location sensors such as GPS-based sensors.

To address these technical problems and challenges, the system 100 of FIG. 1 introduces an approach for dynamic location sampling (e.g., GPS sampling) by time-based extrapolation of vehicle location. In one embodiment, the time-based extrapolation uses historical traffic data to determine a dynamic sampling rate for the location sensor 103 so that a UE 101's or vehicle 105's location is sampled at a reduced rate (e.g., relative to traditional high frequency sampling). For example, the dynamic sampling rate can be calculated to increase near potential road intersections (e.g., within threshold proximity of beginning and end nodes of a road segment link) while decreasing in portions of a road segment that are farther from the intersections where there is generally is a less need for more frequent sampling. In this way, the system 100 advantageously reduces the power and resource consumption needed to operate the location sensor 103 (e.g., GPS sensor) while providing for higher location sampling near locations (e.g., intersections) where more frequent location data is generally needed and reducing the location sampling in areas between those locations where less frequent sampling is generally sufficient to provide navigation and/or mapping related services. In one embodiment, the system 100 uses historical and/or real-time traversal times between intersections or nodes of a road segment to determine when the location sensor 105 of the UE 101 and/or vehicle 105 is near road segment nodes and/or intersections to calculate the dynamic location sampling rate that is to be used by the location sensor 105 while traveling on the corresponding road segment.

Figure 2:
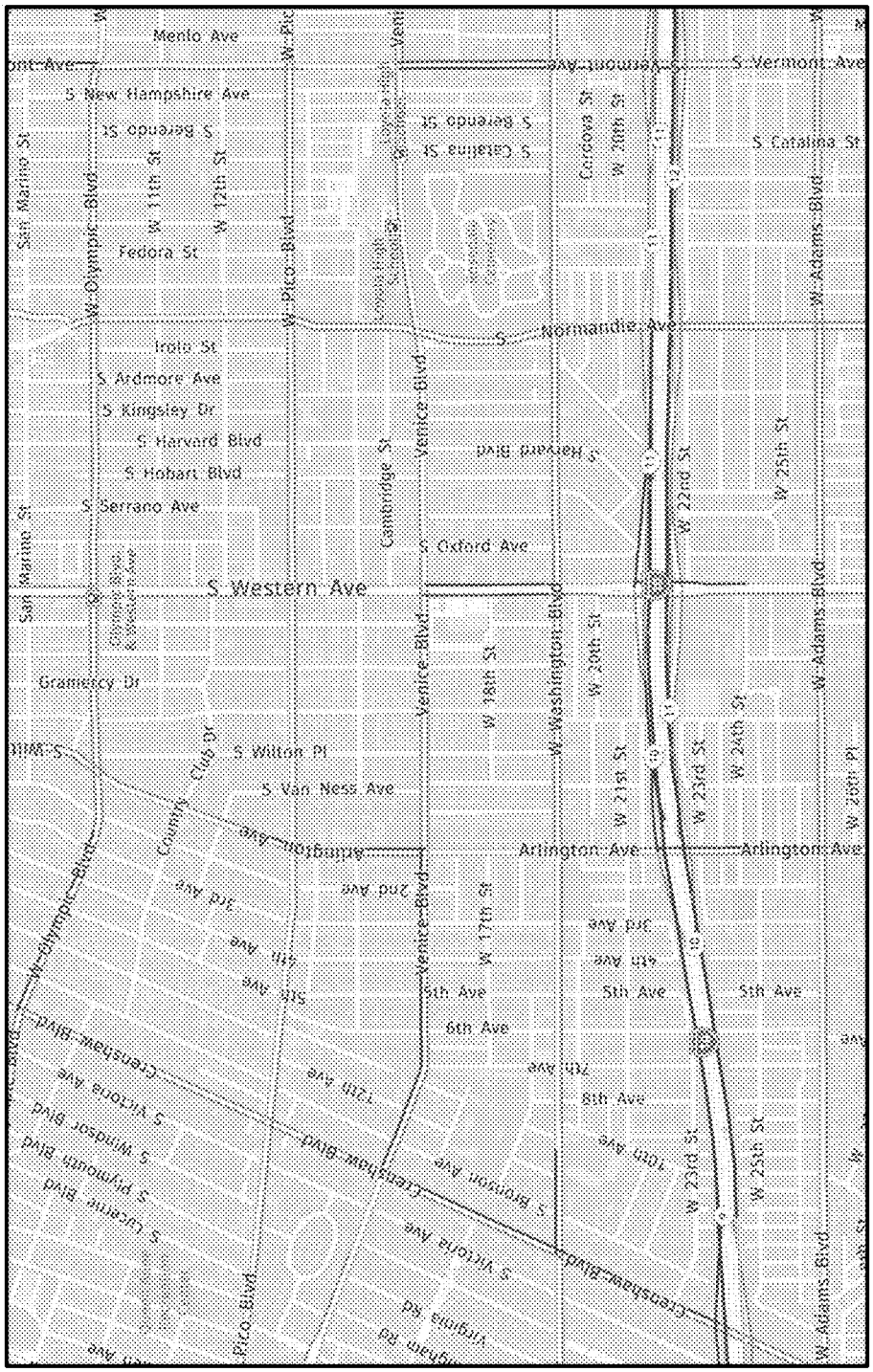
FIG. 2 is a diagram illustrating an example map with traffic data, according to one embodiment.

FIG. 2 is a diagram illustrating an example map 201 with traffic data, according to one embodiment. In this example, the map 201 depicts a road network in a geographic area. The traffic data is then overlaid onto the road network to indicate the relative traffic flow speed (or other equivalent measure of traffic congestion) on a corresponding road segment. Darker highlighting indicates slower traffic speeds or higher traffic congestion, while lighter highlighting indicates higher traffic speeds or lower traffic congestion. Based on the traffic data, each road segment represented in the map 201 has a known estimated time of arrival (e.g., from a beginning node to an end node of the road segment) or segment traversal time that can be calculated or determined from the traffic flow speed and known length of each segment according to the following equation or equivalent:

$$ETA \text{ or Traversal Time} = \text{road segment length/road segment traffic speed}$$

In one embodiment, the system 100 can aggregate the ETA or traversal time data over certain time blocks to generate the historical data (e.g., stored in a geographic database 113 as historical traffic data 115). In one embodiment, the time blocks can cover a most recent designated time period to provide for near real-time ETA or traversal time data. For example, each day can be segmented into time blocks of a designated duration (e.g., every hour, 30 minutes, 15 minutes, etc.). Accordingly, one example time block can be Mondays at 12 PM-1 PM. The corresponding traffic data would then represent the typical traffic observed for that time block. By knowing the historical ETA or traversal time for a given time block on a road segment, the system 100 can then extrapolate a predicted location of a vehicle traveling on the road segment based only on travel time on the current road segment according to the following equation or equivalent:

$$\text{Predicted Location} = \frac{\text{time on road segment}}{ETA \text{ or traversal time}} \times \text{road segment length}$$

Figure 3:
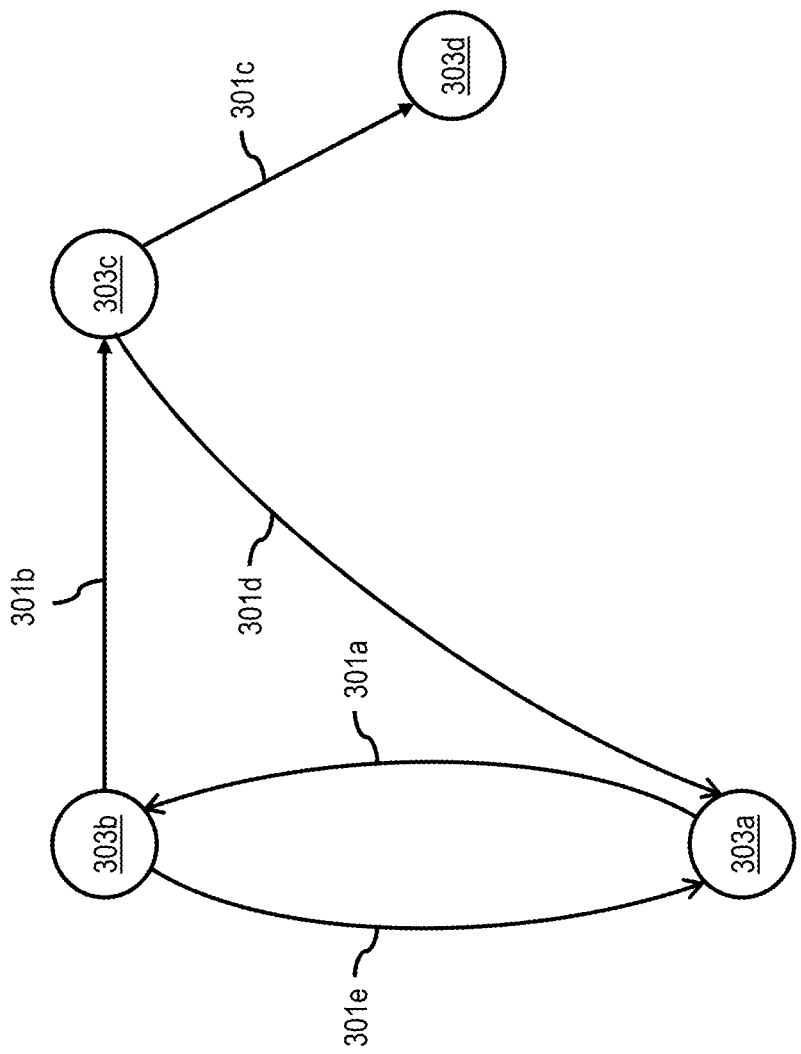
FIG. 3 is a diagram that represents a portion of a road network using edges and vertices (e.g., nodes), according to one embodiment.

In one embodiment, the system 100 can represent a road network map simply as a directed graph, with edges corresponding to road segments with varying lengths (e.g., as defined by distance), and weights (e.g., as defined by traffic) and nodes or vertices corresponding to the intersections (or other end points of the road segment). FIG. 3 is a diagram that represents a portion of a road network as a directed graph using edges 301a-301e (also collectively referred to as edges 301) and vertices/nodes 303a-303d (also collectively referred to as vertices/nodes 303), according to one embodiment. The edges 301 respectively represent road segments connecting the vertices/nodes 303. The edges 301 are also directional with the direction of the edges 301 representing the direction of the traffic flow between the nodes 303. For example, the road segment connecting the nodes 303a and 303b supports bidirectional traffic. Accordingly, the road segment can be represented by a first edge 301a traveling in the direction from the node 303a towards the node 303b, and a second edge 301e traveling in the opposite direction from the node 303b to the node 303a. Thinking abstractly, it becomes preferable to think in terms of edges 301 and vertices 303 for the following reason: for most routing concerns under a driving setting, the vertices/nodes 303 correspond to intersections. For non-driving settings, however, the vertices/nodes 303 can stand for other important geographic features such as, but not limited to, stations for public transportation (e.g., buses, subway, trains, etc.) and additional vertices for walking.

Figure 4:
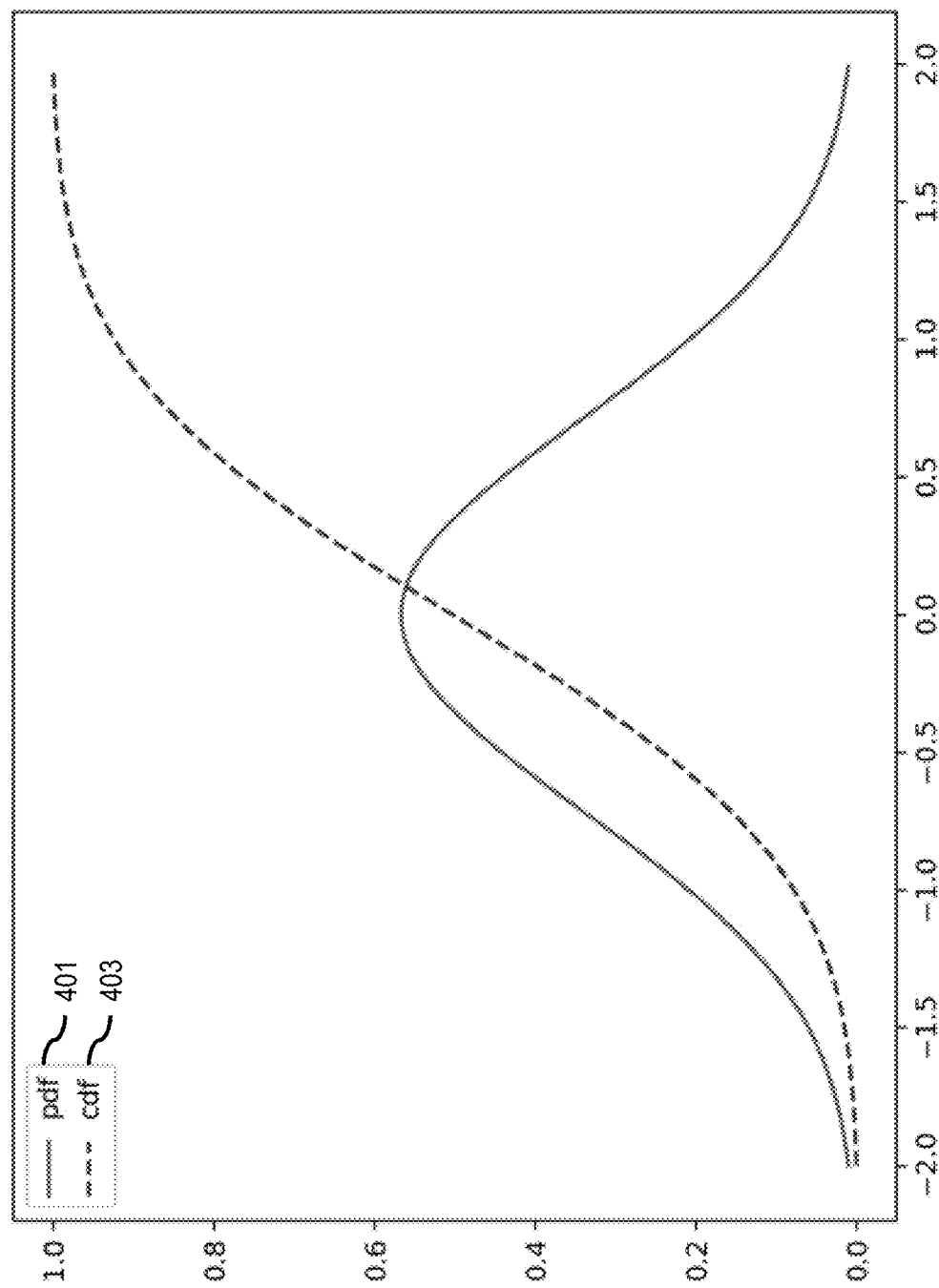
FIG. 4 is a diagram of an example Gaussian distribution of historical traffic data, according to one embodiment.

In one embodiment, over time as historical traffic data is collected, a proper distribution of ETA or traversal times for traversing an edge 301 for a particular vehicle type or mode of transport would emerge for all edges (e.g., stratified per time, seasonality, and/or any other contextual attribute). FIG. 4 is a diagram of an example Gaussian distribution of historical traffic data, according to one embodiment. As shown, the distribution of the historical data generally is a noisy Gaussian distribution. In this example, the Gaussian distribution can be represented as a Partial Distribution Function (PDF) 401, Cumulative Distribution Function (CDF) 403, and/or any other equivalent distribution function. In one embodiment, the system 100 can use the distribution of the historical ETA or traversal time data to calculate an estimated time that the typical vehicle would be expected to traverse a road segment from its beginning node to its end node. This estimated time for sampling represents the sampling rate or time.

As discussed above, knowing the historical and/or near real-time ETA or traversal time data enables the system 100 to perform a time-based extrapolation to predict the location of a UE 101 and/or vehicle 105 on a road segment without having to use the location sensor 103 to sense the location of the UE 101 and/or vehicle 105. This, for instance, enables the system 100 to save battery and/or other related resources by dynamically reducing the need to activate the location sensor 103 when compared to conventional high-frequency or strictly time-based sampling rates for obtaining location data as the UE 101 and/or vehicle 105 travels from road segment to road segment. This is because the system 100 can use the time-extrapolated or predicted locations as the UE 101 and/or vehicle 105 travels between nodes (e.g., between intersections), and then use the location sensor 103 to collect an actual location reading as the UE 101 and/or vehicle 105 approaches the end node of the current road segment where the readings may be more important to maintain location accuracy. In one embodiment, the system 100 can store computed dynamic sampling rate or time for each road segment in the sampling rate database 117 or other equivalent data storage.

In one embodiment, beyond the reduced samples of the embodiments described herein, the system 100 enables end users to define interim (e.g., sanity-check or keep-alive) location samples or signals to check the accuracy of the time-based extrapolations of the predicted locations of the UE 101 and/or vehicle 105. For example, additional sanity-check or keep-alive location samples can be taken by the location sensor 103 every user-designated X minutes or Y % of the time with respect to the ETA determined for the current road segment. If the interim location samples or signals are farther than a distance threshold from the extrapolated or expected location (e.g., above threshold Z meters), full or default high-frequency sampling can be restored for the location sensor 103.

In one embodiment, the system 100 can use a threshold probability of seeing an observed traversal time in light of the historical distribution of travel times. In other words, the system 100 can select a probability the represents the maximum acceptable likelihood that an observed traversal time would occur by chance based on the historical distribution. Allowing the end-user to define this threshold probability would permit the end-user to forego collecting location samples or signals until the time corresponding to the threshold probability prior to the expected ETA or traversal time determined from the historical data. In one embodiment, the system 100 defines a location sample or signal as a "Usable Geolocation Signal" (UGS), which is a map-matched location report with an uncertainty below a threshold uncertainty level (e.g., below a threshold of X meters).

Figure 5:
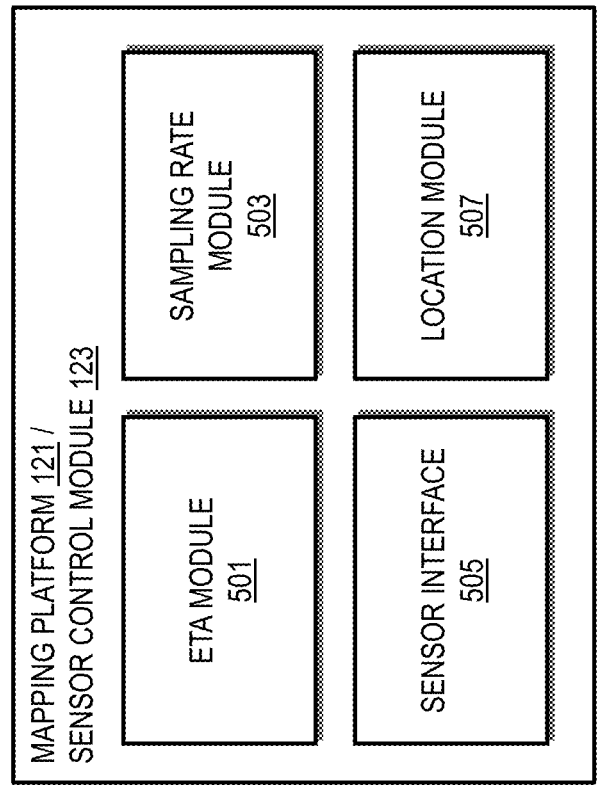
FIG. 5 is a diagram of the components of a mapping platform/sensor control module capable of providing map-based dynamic location sampling, according to one embodiment.

In one embodiment, the system 100 can include a mapping platform 121 as a server-side component for providing map-based dynamic location sampling according to the embodiments described herein. In addition or alternatively, the system 100 can include a sensor control module 123 as a local component of the UE 101 and/or the vehicle 105 (e.g., also equipped with vehicle sensors 125) for providing map-based dynamic location sampling. As shown in FIG. 5, the mapping platform 121 and/or sensor control module 123 include one or more components such as an ETA module 501, a sampling rate module 503, a sensor interface 505, and a location module 507. The above presented modules and components of the mapping platform 111 and/or sensor control module 123 can be implemented in hardware, firmware, software, or a combination thereof. It is contemplated that the functions of these components may be combined or performed by other components of equivalent functionality. Though depicted as a separate entity in FIG. 1, it is contemplated the mapping platform 121 may be implemented as a module of any of the components of the system 100. In another embodiment, the mapping platform 121, sensor control module 123, and/or any of the modules 501-507 may be implemented as a cloud-based service, local service, native application, or combination thereof. The functions of these modules are discussed with respect to FIGS. 6-12 below.

Figure 6:
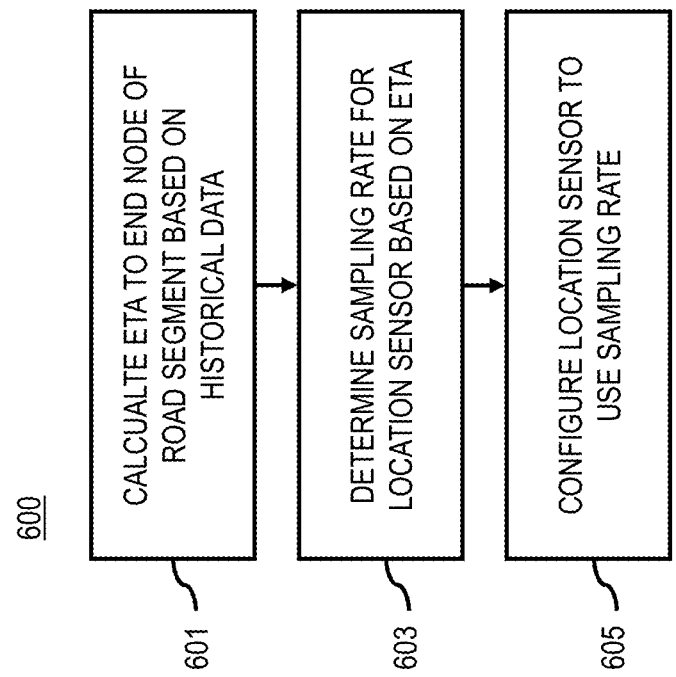
FIG. 6 is a flowchart of a process for providing map-based dynamic location sampling, according to one embodiment.
Figure 15:
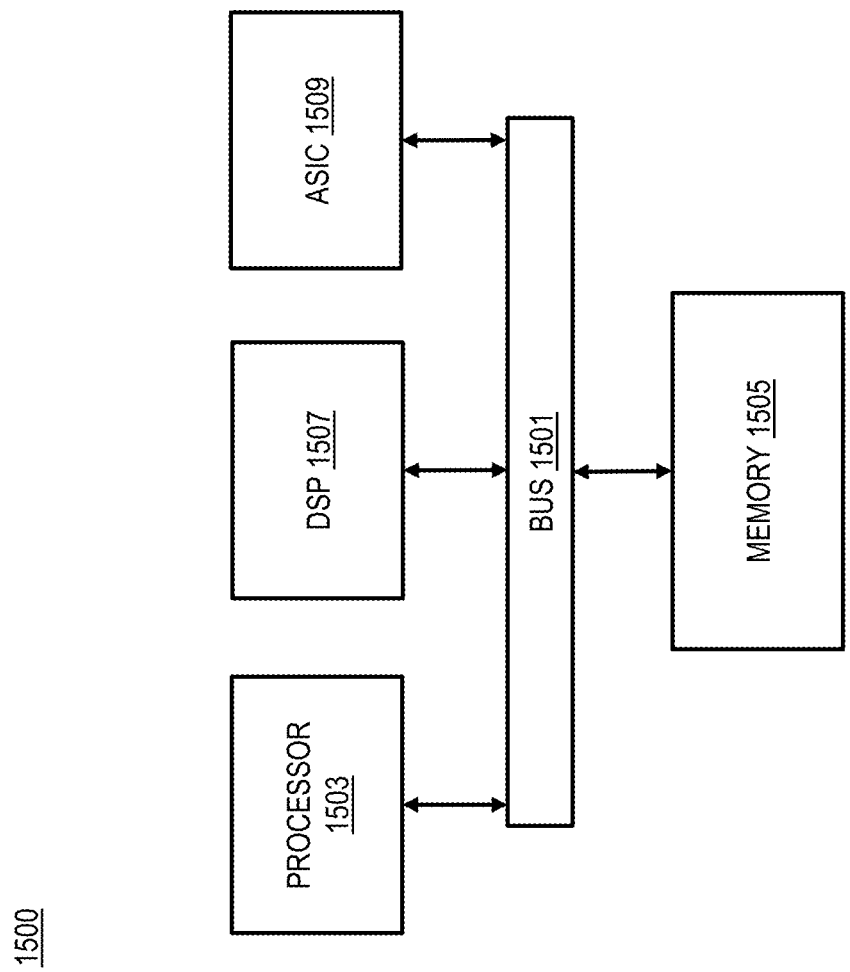
FIG. 15 is a diagram of a chip set that can be used to implement an embodiment.

FIG. 6 is a flowchart of a process for providing map-based dynamic location sampling, according to one embodiment. In various embodiments, the mapping platform 121, sensor control module 123, and/or any of the modules 501-507 may perform one or more portions of the process 600 and may be implemented in, for instance, a chip set including a processor and a memory as shown in FIG. 15. As such, the mapping platform 121, sensor control module 123, and/or any of the modules 501-507 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

In step 601, the ETA module 501 calculates an estimated time of arrival at an end node of a road segment from a beginning node of the road segment based on historical traversal time data for the road segment (e.g., queried from the historical traffic data 115 of the geographic database 113). The historical traversal time data, for instance, has a normal or Gaussian distribution of traversal time values collected over a designated period of time in the past. The traversal time or ETA values can be direct measurements of the time it takes for a vehicle 105 to travel the entire length of the road segment (e.g., from the beginning node to the end node of the road segment). Alternatively, the historical traffic data can include data values (e.g., traffic flow speeds and road segments lengths) that can be used to derive the ETA or traversal time data. In one embodiment, the ETA module 501 processes the historical traversal time data to determine a mean time of arrival, a standard deviation of a time or arrival, and/or any other equivalent statistical parameter. Accordingly, the estimated time of arrival can be based on the calculated mean time of arrival, standard deviation, etc.

In one embodiment, the historical data can be specific to various types or attributes of the vehicle, driver, road segment, and/or other contextual parameters (e.g., weather conditions, traffic incidents, etc.). For example, the ETA module 501 can determine a time epoch, contextual data, or a combination thereof associated with the vehicle traveling the road segment. The historical traversal time data can then be selected to correspond to the time epoch, the contextual data, or a combination thereof. By way of example, as noted, the contextual data includes traffic data, weather data, or a combination thereof for the road segment. The ETA module 501 can then adjust the estimated time of arrival, the historical traversal time data, or a combination thereof based on contextual data associated with the vehicle traveling the road segment. In other words, if the contextual data indicates a 50% slowdown of traffic on the current road segment, the historical value (e.g., that reflects normal free flow speeds for the time), the ETA module 501 can apply the same 50% factor on the historical ETA to better approximate current conditions on the road segment for more accurate time-based extrapolations of the vehicle 105 or UE 101.

In step 603, the sampling rate module 503 determines a sampling rate for a location sensor of a vehicle 105 or UE 101 traveling the road segment based on the estimated time of arrival. As discussed above, the sampling rate module 503 can use the historical ETA or traversal time data to perform a time-based extrapolation to predict the location of the vehicle 105 or UE 101 to take the place of some location signals that would be collected using conventional high-frequency or time-based location sampling. As a result, the dynamic sampling rate for the location sensor can be dynamically reduced so that an actual location sample would have to be taken less frequently. For example, dynamic refers to a location sampling rate that can vary over a road segment as opposed to a traditional sampling rate that is fixed over a given road segment. In one embodiment, the sampling rate module 503 can create a dynamic sampling rate that causes the location sensor to collect one sample at the beginning of the road segment (e.g., on arrival at the beginning node) and then again when approaching the end of the road segment within a threshold distance, while eliminating or reducing the number of samples collected between the at locations farther than the threshold distance from the nodes. The sampling rate module 503 uses the time-based location extrapolation to predict when the vehicle approaches within the distance threshold of the end node of the road segment. Actual location samples by the location sensor would then not be needed or can otherwise be reduced between the two sampling points of the determined dynamic sampling rate. In one embodiment, the sampling rate (e.g., the sampling time before the end of the road segment) is calculated based on a z-score of a designated percentage of the normal distribution (or other equivalent probability). In other words, the sampling rate module determines a travel on the road segment where the vehicle would most likely still be on the road segment and not likely to have traveled beyond the end node of the road segment based on historical traversal times for the road segment. In one embodiment, the sampling rate module 503 stores the sampling rate as an attribute of the road segment, a map cell containing the road segment, or a combination thereof in a geographic database 113. In this way, subsequent vehicles traveling the same road segment can retrieve the corresponding sampling rate for the road segment without having to calculate the rate on its own.

In one embodiment, the system 100 can calculate the sampling rate with respect to a map tile or grid cell unit of a digital map (e.g., the digital map of the geographic database 113) instead of or in addition to the road segment. In other words, a parallel approach to the road segment-based approach described herein is to look at grid cells (e.g., Mercator or S2 cells), and set dynamic sampling rates within a cell if needed rather than looking at road segments. This grid cell approach would potentially provide a lower level of granularity which is less memory intensive. This would provide significant technical advantages in computing environments that are more memory or resource constrained (e.g., mobile devices).

In step 605, the sensor interface 505 configures the location sensor to collect location data using the sampling rate. In one embodiment, the configuring of the locations includes determining a sampling time occurring before the estimated time of arrival based on the sampling rate. The sensor interface 505 then initiates a capture of a geolocation signal by the location sensor at the sampling time as the location data. As described previously, in one embodiment, the geolocation signal is a usable geolocation signal, and wherein the usable geolocation signal has an uncertainty value below a threshold value.

Figure 7:
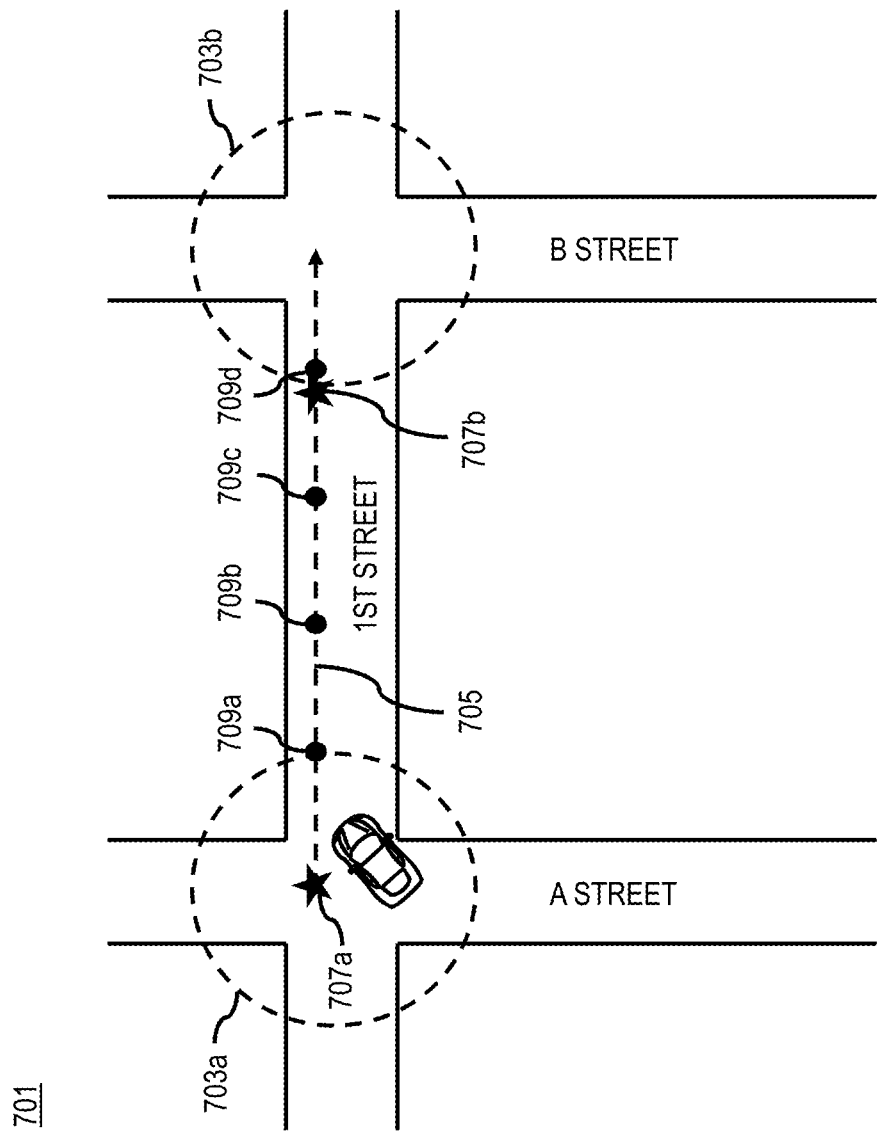
FIG. 7 is a diagram illustrating an example of map-based dynamic location sampling, according to one embodiment.

FIG. 7 is a diagram illustrating an example of map-based dynamic location sampling, according to one embodiment. As shown, the map 701 includes a portion of a road network that includes a first vertex 703a (e.g., at the intersection of A Street and $1^{st}$ Street) and a second vertex 703b (e.g., at the intersection of B Street and $1^{st}$ Street) connected via a directed edge 705 traveling from vertex 703a to vertex 703b. In this example, a vehicle 105 turns right onto $1^{st}$ Street from A Street at 12 PM. As the vehicle 105 merges onto the $1^{st}$ Street, the first location sample 707a is collected by a location sensor is collected and placed on $1^{st}$ Street at or near (e.g., within a threshold distance) of the first vertex 703a. The historical ETA to the intersection at the second vertex 703b is normally distributed (e.g., with a mean=10 min and standard deviation=2 min). The mapping platform 121 can take the Z-score for 10% of the distribution (e.g., equivalent to 90% from the right side of the distribution) from a Z-score table which yields a Z-score of −1.29. This Z-score translates to 7.42 min given the example distribution by using, for example, the following:

$$x = \mu - \sigma Z$$

Therefore, the mapping platform 121 can calculate a sampling rate that specifies that a location sample should be collected using the location sensor by 7.42 minutes after the vehicle 105 turned the corner onto $1^{st}$ Street from A Street (e.g., marked as sample location 707b). In one embodiment, the user can also request a map-matched location sample to be collected (e.g., at each 20% of the duration to the ETA) on the directed edge 705 as a sanity-check or keep alive signal. Therefore, in this example, the location sensor will be configured to collect a location sample every 1.48 minutes while traveling on the directed edge 705. The keep-alive sampling times are illustrated at their time-extrapolated locations on the directed edge 705 as keep-alive points 709a-709d. In case, a sanity-check or keep-alive location signal lies beyond an acceptable error (e.g., a distance threshold) from the expected or predicted location (e.g., predicted from time-based extrapolation), the location sensor can return to full or default sampling from the reduced dynamic sampling rate. This return to full or default sampling is referred to as "path recovery" and is described in more detail with respect to the embodiments of the process of 900 of FIG. 9 below.

Figure 8:
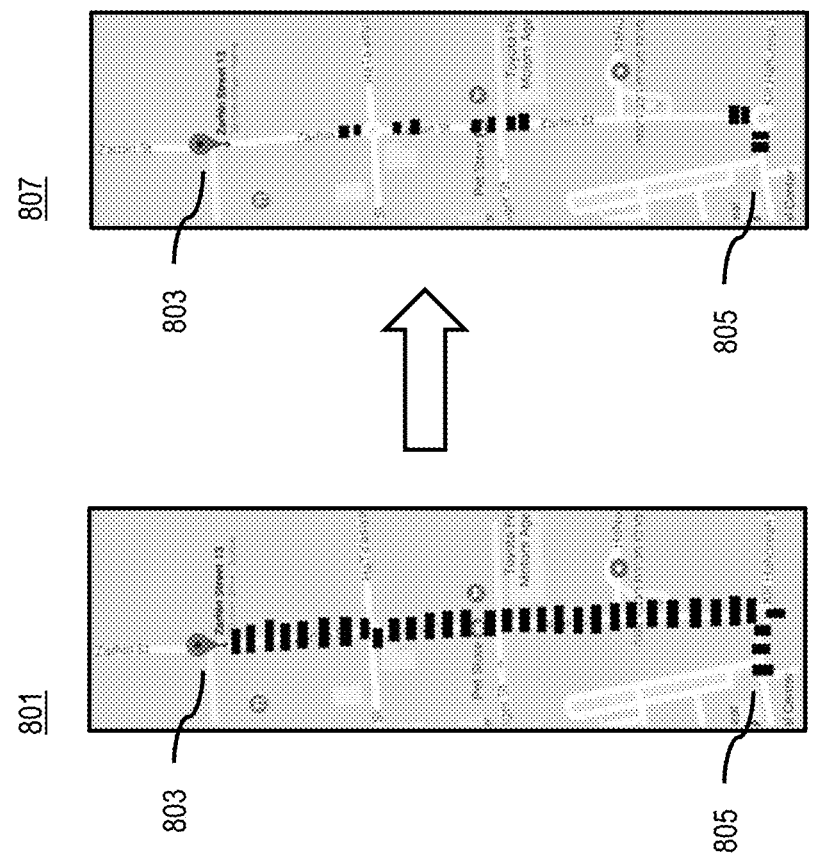
FIG. 8 is a diagram comparing conventional location sampling to map-based dynamic location sampling, according to one embodiment.

FIG. 8 is a diagram comparing conventional location sampling to map-based dynamic location sampling, according to one embodiment. More specifically, FIG. 8 illustrates first scenario 801 in which a vehicle is traveling from a starting point 803 to a destination 805. The black dashes indicated on the road segments between the starting point 803 and destination 805 indicate location samples that are collected by a location sensor of the vehicle configured to operate using a conventional high-frequency sampling rate. The second scenario 807 illustrates the same vehicle and route between the starting point 803 and the destination 805 but the location sensor is now configured to collect location samples using the dynamic sampling rate generated according to the embodiments described herein. As shown in the second scenario 807, there fewer black dashes indicating that the dynamic sampling rate has reduced the number of actual location readings that are taken by the location sensor over the same route. Because location sensors (especially GPS sensors) can be considerable battery drains, the reduced number of actual samples taken during the route advantageously reduces battery consumption as well as device resources needed to process the location samples.

Figure 9:
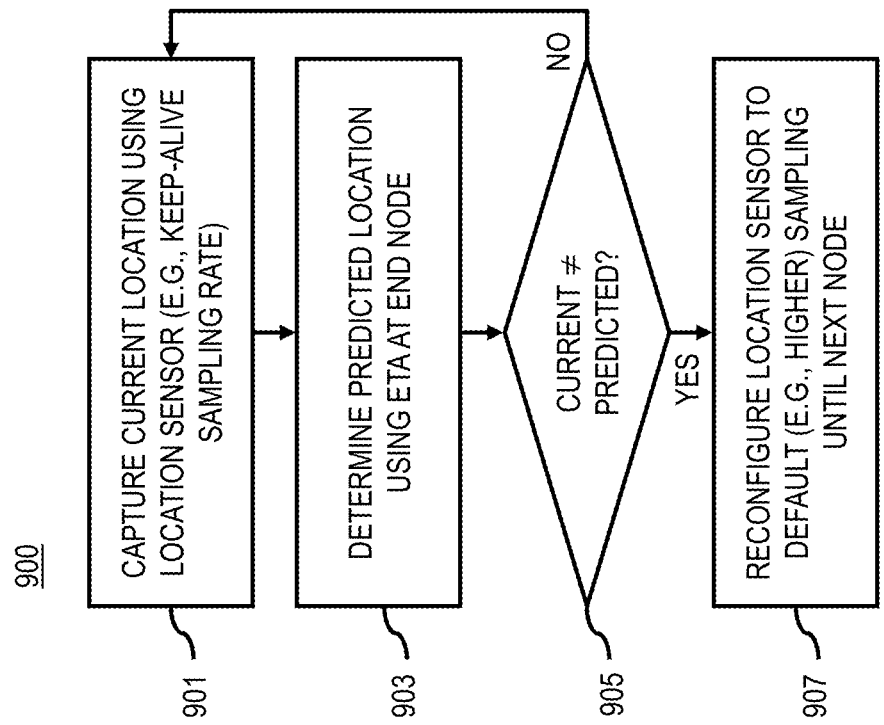
FIG. 9 is a flowchart of a process for path recovery when using map-based dynamic location sampling, according to one embodiment.

FIG. 9 is a diagram of a process for path recovery when using map-based dynamic location sampling, according to one embodiment. In various embodiments, the mapping platform 121, sensor control module 123, and/or any of the modules 501-507 may perform one or more portions of the process 900 and may be implemented in, for instance, a chip set including a processor and a memory as shown in FIG. 15. As such, the mapping platform 121, sensor control module 123, and/or any of the modules 501-507 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

As described above, in one embodiment, the mapping platform 121 can use actual location samples to verify that the predicted locations of the time-based extrapolation used in the embodiments described herein to reduce location sampling rate. In one embodiment, the process 900 can be used alone or in combination with the process 600 of FIG. 6 for map-based dynamic location sampling. The location sensor, for instance, can be configured to collect the location samples at a sanity-check or keep-alive sampling frequency that is independent of the dynamic sampling frequency generated according to the embodiments described herein.

Accordingly, in step 901, the sensor interface 505 initiates a capture of a current location (e.g., an actual location sample or reading) of a vehicle on a road segment by a location sensor based on a keep-alive sampling rate. In one embodiment, the location sensor is configured to operate at a sampling rate that is reduced from a default sampling rate (e.g., the dynamic sampling rate generated according to the embodiments described herein) in addition to the keep-alive sampling rate. The keep-alive sampling rate can be specified based on a percentage value of the estimated time of arrival (e.g., every 20% of the ETA or traversal time) or at some other time-based frequency. Generally, this keep-alive sampling rate is less than the conventional or default sampling rate of the location sensor to provide for advantageous reduction of battery and resource consumption.

In step 903, the location module 507 determines a predicted location of the vehicle based on an estimated time of arrival of the vehicle at an end node of the road segment. For example, the estimated time of arrival can be based on historical traversal time data for the road segment. In one embodiment, the predicted location is determined using a time-based extrapolation with respect to the determined ETA. For example, the ratio or fraction of the time on the road segment to the ETA is used to predict the location of the vehicle on the road segment (e.g., by multiplying the road segment length by the ratio or fraction).

In step 905, the location module 507 determines whether the predicted location differs from the current location by more than a threshold distance. To determine the predicted location, the location module 507 can determine the current time on the road segment (e.g., travel time of the vehicle since passing the beginning node of the road segment). The current time is then used to extrapolate the predicted location as described in the various embodiments. If predicted location and the current do not differ by more than the threshold distance, the currently configured dynamic sampling rate is maintained and the process 900 returns to the step 901 to evaluate the next sampled or captured location signal against the predicted or time-extrapolated location. On the other hand, if the location module 507 determines that the predicted location differs from the current location by more than the threshold distance, the sensor interface 505 reconfigures the location sensor to operate at the default sampling frequency (step 907). In one embodiment, the location sensor is reconfigured to operate at the default sampling rate until the vehicle is detected to reach the end node of the road segment or the beginning node of the next road segment. This process is referred to as path recovery because a difference beyond the threshold distance indicates that the time-based extrapolation may not be an accurate representation of the vehicle's position on the road segment. As a result, a traditional or conventional high-frequency sampling rate can provide better accuracy.

Figure 10:
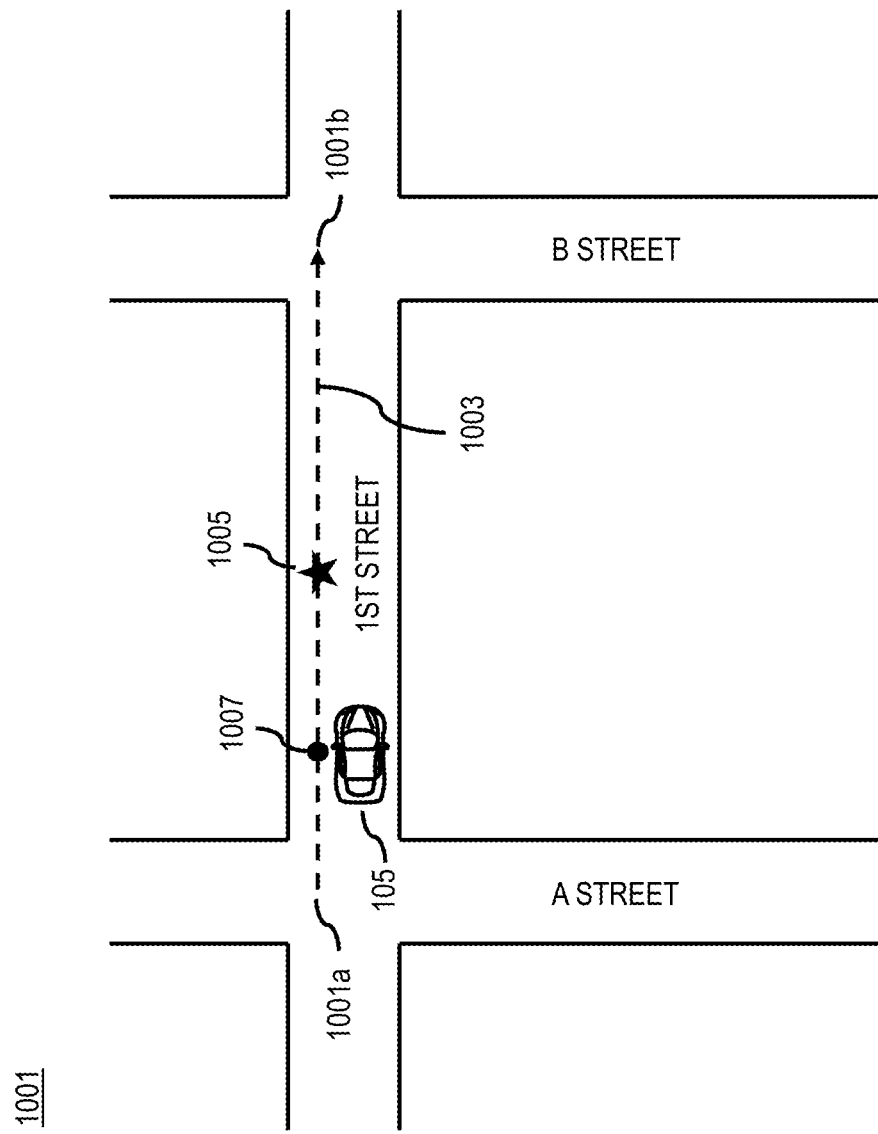
FIG. 10 is diagram illustrating an example of performing path recovery when using map-based dynamic location sampling, according to one embodiment.

FIG. 10 is diagram illustrating an example of performing path recovery when using map-based dynamic location sampling, according to one embodiment. In this example, a vehicle 105 is traveling from a beginning node 1001a to an end node 1001b connected by a directed edge 1003 corresponding to a road segment that is 1 mile long. The ETA from the beginning node 1001a to the end node 1001b is 10 mins based on historical data. The location sensor associated with the vehicle 105 is configured to take a keep-alive location reading at 5 mins. The predicted location of the vehicle using a time-based extrapolation would then be approximately 0.5 miles from the beginning node (e.g., 0.5 miles=1 mile×(5 mins/10 mins) based the extrapolation equation described above) as indicated by location 1005. However, the keep-alive location reading indicates that vehicle 105 is actually 0.25 miles from the beginning node 1001a as indicated by location 1007. The difference between the predicted location 1007 and the current location 1007 is then 0.25 miles. In this example, the distance threshold is 0.1 miles. Accordingly, because the difference (0.25 miles) is greater than the distance threshold (0.1 miles), the location sensor of the vehicle is reconfigured with a default or high-frequency sampling rate to improve accuracy until the vehicle reaches the end node 1001b of the directed edge 1003 (i.e., path recovery).

In one embodiment, the location module 507 can track whether the observed instance of path recovery (e.g., predicted location not matching the current location) is a unique instance or a general issue for multiple vehicles on the road segment. For example, the location module 507 can track the difference between one or more subsequent current locations and one or more subsequent predicted locations for the vehicle, a driver of the vehicle, or a combination therefore. The location module 507 can then flag the vehicle, the driver, or a combination thereof based on determining that the difference exceeds a threshold criterion. The criterion, for instance, can specify that if the driver or vehicle exceeds the distance threshold multiple times on the same road segment or on different road segments, the driver or vehicle should be flagged. The flagging, for instance, indicates that the vehicle, the driver, or a combination thereof is operating inconsistently with the historical traversal time data.

In one embodiment, if the difference is observed across multiple drivers or vehicles, the mapping platform 121 may determine that there is an underlying issue specific to the road segment. For example, the road segment may be in an area with poor GPS performance (e.g., an urban canyon susceptible to multipath interference). Accordingly, in one embodiment, the flagging of road segments can be used to determine whether external location sensor coverage is warranted to reduce zones or road segments that would otherwise require or trigger high frequency sampling (e.g., because the predicted locations of determined for dynamic location sampling differs significantly from actual location readings by location sensors). In other words, an embodiment of the approach is to identify "low predictable" GPS locations (e.g., geo-coordinates plus radius) and to enhance the corresponding coverage by applying side-information sources (e.g., external location sensors). The mapping platform 121 can then map these areas of poor GPS performance based on data variance from multiple vehicles. The mapping platform 121 can also increase the sampling rate in these areas to improve the precision of mapping the areas for location sensor performance.

Figure 11:
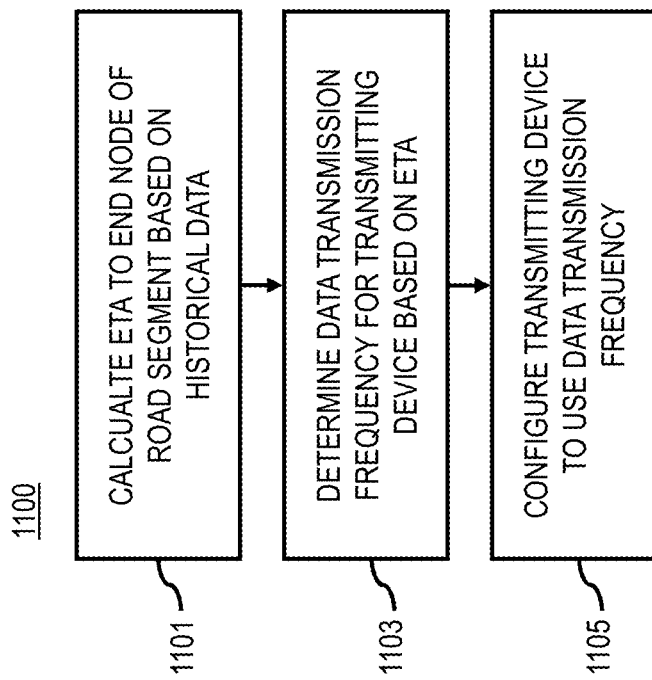
FIG. 11 is a flowchart of a process for providing map-based dynamic transmissions from a device, according to on embodiment.

FIG. 11 is a flowchart of a process for providing map-based dynamic transmissions from a device, according to on embodiment. In various embodiments, the mapping platform 121, sensor control module 123, and/or any of the modules 501-507 may perform one or more portions of the process 1100 and may be implemented in, for instance, a chip set including a processor and a memory as shown in FIG. 15. As such, the mapping platform 121, sensor control module 123, and/or any of the modules 501-507 can provide means for accomplishing various parts of the process 1100, as well as means for accomplishing embodiments of other processes described herein in conjunction with other components of the system 100. Although the process 1100 is illustrated and described as a sequence of steps, its contemplated that various embodiments of the process 1100 may be performed in any order or combination and need not include all of the illustrated steps.

The embodiments above have been described with respect to dynamic location sampling. However, in one embodiment, the dynamic rate calculation process is also applicable to determining how often data is transmitted from a UE 101 or other mobile device (e.g., a data transmission frequency indicating when data is to be transmitted and/or received from or by a device). Accordingly, the process 1100 describes embodiments that are analogous to the those described above with respect to FIGS. 6-10 with the exception that instead of generating a dynamic location sampling rate for a location sensor, the process 1100 generates a dynamic data transmission frequency for a transmitting device.

In step 1101, the ETA module 501 calculates an estimated time of arrival at an end node of a road segment from a beginning node of the road segment based on historical traversal time data for the road segment. The step can be performed according to the embodiments of the process 600 above or equivalent.

In step 1103, the sampling rate module 503 determines a data transmission frequency for a transmitting device of a vehicle traveling the road segment based on the estimated time of arrival. The data transmission frequency, for instance, indicates a travel time along the road segment at which the transmitting device is to transmit the data. For example, just as with location sampling, transmitting data between a UE 101 and server component or other data recipient typically occurs at a relatively high frequency (e.g., as the location is captured). This is particularly true with respect to providing real-time location data from UE 101 to provide cloud-based location services (e.g., mapping, navigation, etc.).

In step 1105, the sensor interface 505 configures the transmitting device to transmit data from the vehicle at the data transmission frequency. By way of example, the data transmission frequency is a reduced with respect to a default data transmission frequency of the transmitting device. In one embodiment, the historical traversal time data has a normal distribution, and wherein the data transmission frequency is calculated based on a Z-score of a designated percentage of the normal distribution.

In one embodiment, the data includes location data collected from a location sensor of the vehicle. The location module 507, for instance, can aggregate the location data from a plurality of location signals collected by the location sensor while the vehicle is traveling on the road segment. The data that is transmitted is the aggregated location data. In this way, the location module 507 can batch the location data together for aggregate transmission of the data as a batch. In one embodiment, the dynamic transmission frequency can be coupled with the dynamic location sampling rate so that the transmission will correspond to each respective location sample collected using the dynamic location sampling of the various embodiments described herein.

In one embodiment, the location module 507 can perform a similar path recovery process for transmitting data. For example, the location module 507 determines a predicted location of the vehicle based on the estimated time of arrival. The sensor interface 505 then reconfigures the transmitting device to transmit the data at a default transmission frequency based on determining that the predicted location differs from the location data by more than a threshold distance. In one embodiment, the sensor interface 505 can also reconfigure the transmitting device to transmit the data at the data transmission frequency from the default transmission frequency based on detecting that the vehicle has arrived at the end node.

Figure 12:
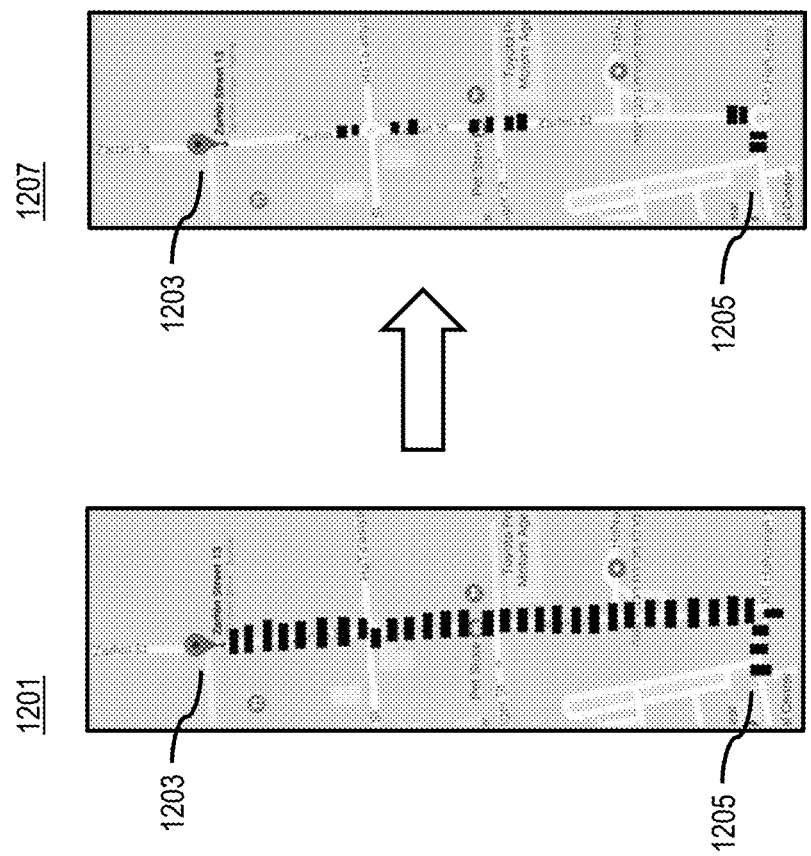
FIG. 12 is diagram illustrating an example of operating a transmitting device using a dynamic transmission frequency, according to one embodiment.

FIG. 12 is diagram illustrating an example of operating a transmitting device using a dynamic transmission frequency, according to one embodiment. The example of FIG. 12 is similar to the example of FIG. 8. As shown, FIG. 12 illustrates first scenario 1201 in which a vehicle is traveling from a starting point 1203 to a destination 1205. The black dashes indicated on the road segments between the starting point 1203 and destination 1205 indicate data transmission times that the vehicle or a mobile device (e.g., a UE 101) associated with the vehicle transmits data (e.g., location data) to a cloud-based service sing a conventional high-frequency transmission frequency. The second scenario 1207 illustrates the same vehicle and route between the starting point 1203 and the destination 1205 but the transmitting device is now configured to transmit data using the dynamic data transmission frequency generated according to the embodiments described herein. As shown in the second scenario 1207, the fewer black dashes indicating that the dynamic data transmission frequency has reduced the number of data transmission that are made by the transmitting device, thereby advantageously reducing data consumption and/or other resources (e.g., network bandwidth, memory, etc.) used for transmitting the data.

Returning to FIG. 1, as shown, the system 100 includes the vehicle 105 with connectivity to the mapping platform 121 for providing map-based dynamic location sampling according to the various embodiments described herein. In one embodiment, the vehicle 105 can include sensors 125 (including location sensors) and/or be associated with the UE 101 that includes sensors 103 that can be configured with the dynamic location sampling rates and/or dynamic data transmission frequencies generated according to the embodiments described herein.

In one embodiment, the mapping platform 121, vehicle 105, UE 101, and/or other end user devices have connectivity or access to the geographic database 113 which stores representations of mapped geographic features to facilitate location-based services such as but not limited to autonomous driving and/or other mapping/navigation-related applications or services.

In one embodiment, the mapping platform 121, vehicle 105, UE 101, etc. have connectivity over the communication network 127 to the services platform 109 that provides one or more services 107 that can use the output of the dynamic location sampling processes described herein. By way of example, the services 107 may be third party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the mapping platform 121, services platform 109, and/or other components of the system 100 may be platforms with multiple interconnected components. The mapping platform 121, services platform 109, etc. may include multiple servers, intelligent networking devices, computing devices, components and corresponding software for providing map-based dynamic location sampling. In addition, it is noted that the mapping platform 111 may be a separate entity of the system 100, a part of the one or more services 107, a part of the services platform 109, or included within the UE 101 and/or vehicle 105.

In one embodiment, content providers 129a-129m (collectively referred to as content providers 129) may provide content or data to the geographic database 113, the mapping platform 111, the services platform 109, the services 107, the UE 101, and/or the vehicle 105. The content provided may be any type of content, such as map content, textual content, audio content, video content, image content, etc. In one embodiment, the content providers 129 may provide content that may aid in the detecting and ensuring the quality of map features and their properties from sensor data and estimating the confidence and/or accuracy of the detected features. In one embodiment, the content providers 129 may also store content associated with the geographic database 113, mapping platform 111, services platform 109, services 107, UE 101, and/or vehicle 105. In another embodiment, the content providers 129 may manage access to a central repository of data, and offer a consistent, standard interface to data, such as a repository of the geographic database 113.

In one embodiment, the UE 101 and/or vehicle 105 may execute a software application to map-based dynamic location sampling according the embodiments described herein. By way of example, the application may also be any type of application that is executable on the UE 101 and/or vehicle 105, such as autonomous driving applications, mapping applications, location-based service applications, navigation applications, content provisioning services, camera/imaging application, media player applications, social networking applications, calendar applications, and the like. In one embodiment, the application may act as a client for the mapping platform 121, services platform 109, and/or services 107 and perform one or more functions associated with map-based dynamic location sampling.

By way of example, the UE 101 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the UE 101 may be associated with the vehicle 105 or be a component part of the vehicle 105.

In one embodiment, the UE 101 and/or vehicle 105 are configured with various sensors for generating or collecting environmental sensor data (e.g., for processing by the mapping platform 111 and/or sensor control module 123), related geographic data, etc. including but not limited to, location, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 101 and/or vehicle 105 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 101 and/or vehicle 105 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 101 and/or vehicle 105 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 127 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, services platform 109, services 107, UE 101, vehicle 105, and/or content providers 129 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 13:
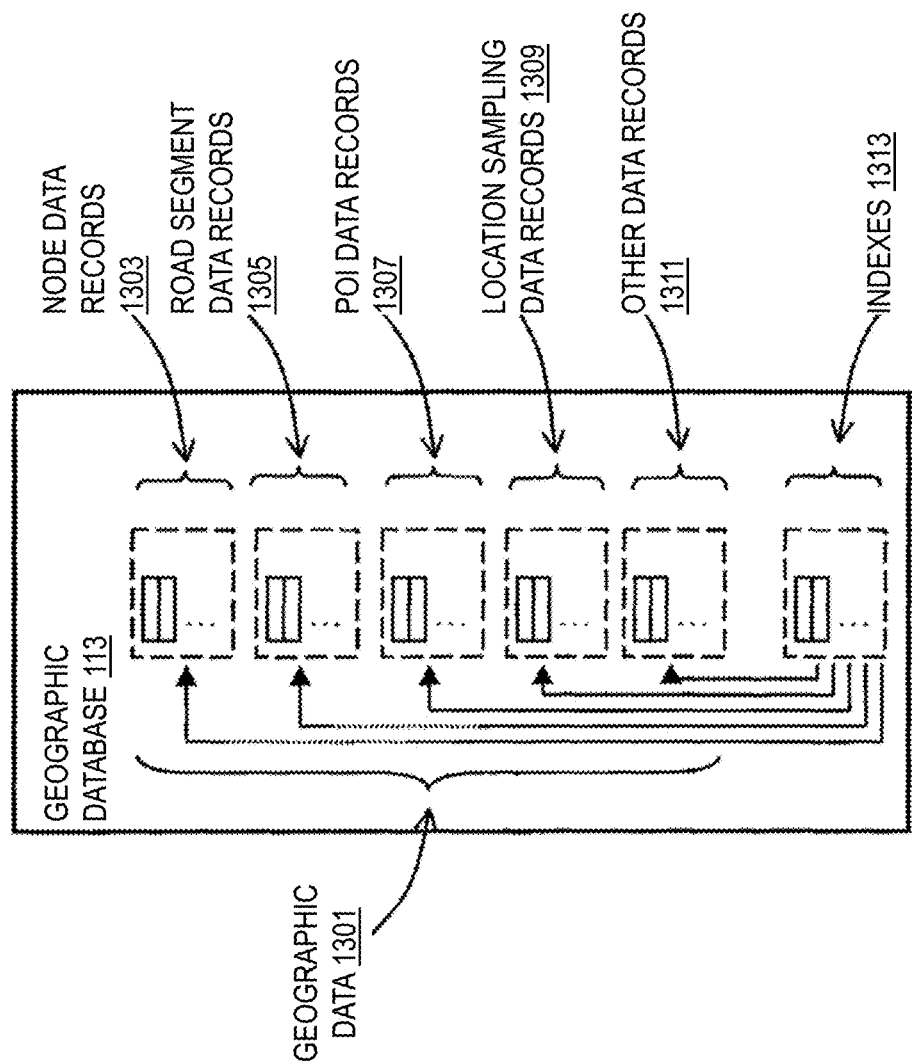
FIG. 13 is a diagram of a geographic database that can be used for map-based dynamic location sample, according to one embodiment.

FIG. 13 is a diagram of a geographic database, according to one embodiment. In one embodiment, the geographic database 113 includes geographic data 1301 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 1303, road segment or link data records 1305, POI data records 1307, location sampling data records 1309, other records 1311, and indexes 1313, for example. More, fewer or different data records can be provided. In one embodiment, additional data records (not shown) can include cartographic ("carto") data records, routing data, and maneuver data. In one embodiment, the indexes 1313 may improve the speed of data retrieval operations in the geographic database 113. In one embodiment, the indexes 1313 may be used to quickly locate data without having to search every row in the geographic database 113 every time it is accessed. For example, in one embodiment, the indexes 1313 can be a spatial index of the polygon points associated with stored feature polygons.

In exemplary embodiments, the road segment data records 1305 are links or segments representing roads, streets, or paths, as can be used in the calculated route or recorded route information for determination of one or more personalized routes. The node data records 1303 are end points corresponding to the respective links or segments of the road segment data records 1305. The road link data records 1305 and the node data records 1303 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 1307. The geographic database 113 can also include data about places, such as cities, towns, or other communities, and other geographic features, such as bodies of water, mountain ranges, etc. Such place or feature data can be part of the POI data records 1307 or can be associated with POIs or POI data records 1307 (such as a data point used for displaying or representing a position of a city).

In one embodiment, the geographic database 113 can also include location sampling data records 1309 for storing dynamic location sampling rates, dynamic data transmission rates, historical ETA/traversal time data, and/or related data. The location sampling data records 1309 can also include collected vehicle sensor data, path recovery requests including predicted locations and actual locations, service recommendations, detected road anomalies, and/or the like. In one embodiment, the location sampling data records 1309 and/or the dynamic location sampling rates/data transmission frequencies can be associated with segments of a road link (as opposed to an entire link). It is noted that the segmentation of the road for the purposes of map-based dynamic location sampling and/or data transmission frequencies can be different than the street network or road link structure of the geographic database 113. In other words, the segments can further subdivide the links of the geographic database 113 into smaller segments (e.g., of uniform lengths such as 5-meters). In this way, the dynamic location sampling rates/data transmission frequencies can be represented at a level of granularity that is independent of the granularity or at which the actual road or road network is represented in the geographic database 113. In one embodiment, the location sampling data records 1309 can be associated with one or more of the node records 1303, road segment records 1305, and/or POI data records 1307; or portions thereof (e.g., smaller or different segments than indicated in the road segment records 1305, individual lanes of the road segments, etc.).

In one embodiment, the geographic database 113 can be maintained by the content provider 129 in association with the services platform 109 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

In one embodiment, the geographic database 113 include high resolution or high definition (HD) mapping data that provide centimeter-level or better accuracy of map features. For example, the geographic database 113 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 113 is stored as a hierarchical or multi-level tile-based projection or structure. More specifically, in one embodiment, the geographic database 113 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached. In one embodiment, the map-based dynamic location sampling rates/data transmission rates can be associated with individual grid cells at any zoom level.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 113 can be a geographic database stored in a format that facilitates updating, maintenance, and development. For example, the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105 and/or UE 101. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received network in a delivery format to produce one or more compiled navigation databases.

The processes described herein for providing map-based dynamic location sampling may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
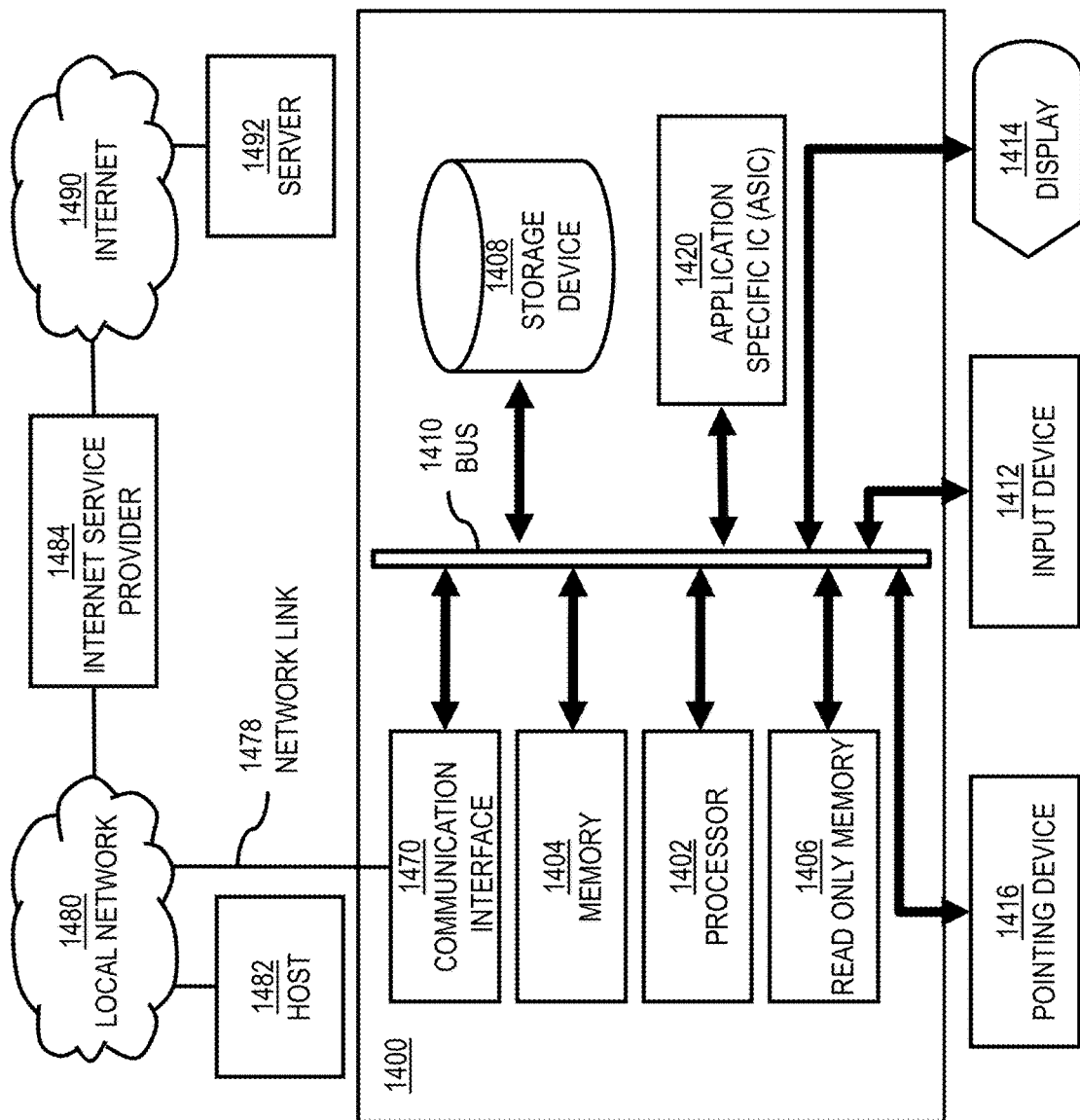
FIG. 14 is a diagram of hardware that can be used to implement an embodiment.

FIG. 14 illustrates a computer system 1400 upon which an embodiment of the invention may be implemented. Computer system 1400 is programmed (e.g., via computer program code or instructions) to provide map-based dynamic location sampling as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to providing map-based dynamic location sampling. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for providing map-based dynamic location sampling. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1808, such as a magnetic disk, optical disk or flash card, for storing information, including instructions, that persists even when the computer system 1400 is turned off or otherwise loses power.

Information, including instructions for providing map-based dynamic location sampling, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 127 for providing map-based dynamic location sampling.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 15 illustrates a chip set 1500 upon which an embodiment of the invention may be implemented. Chip set 1500 is programmed to provide map-based dynamic location sampling as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to provide map-based dynamic location sampling. The memory 1505 also stores the data associated with or generated by the execution of the inventive steps.

Figure 16:
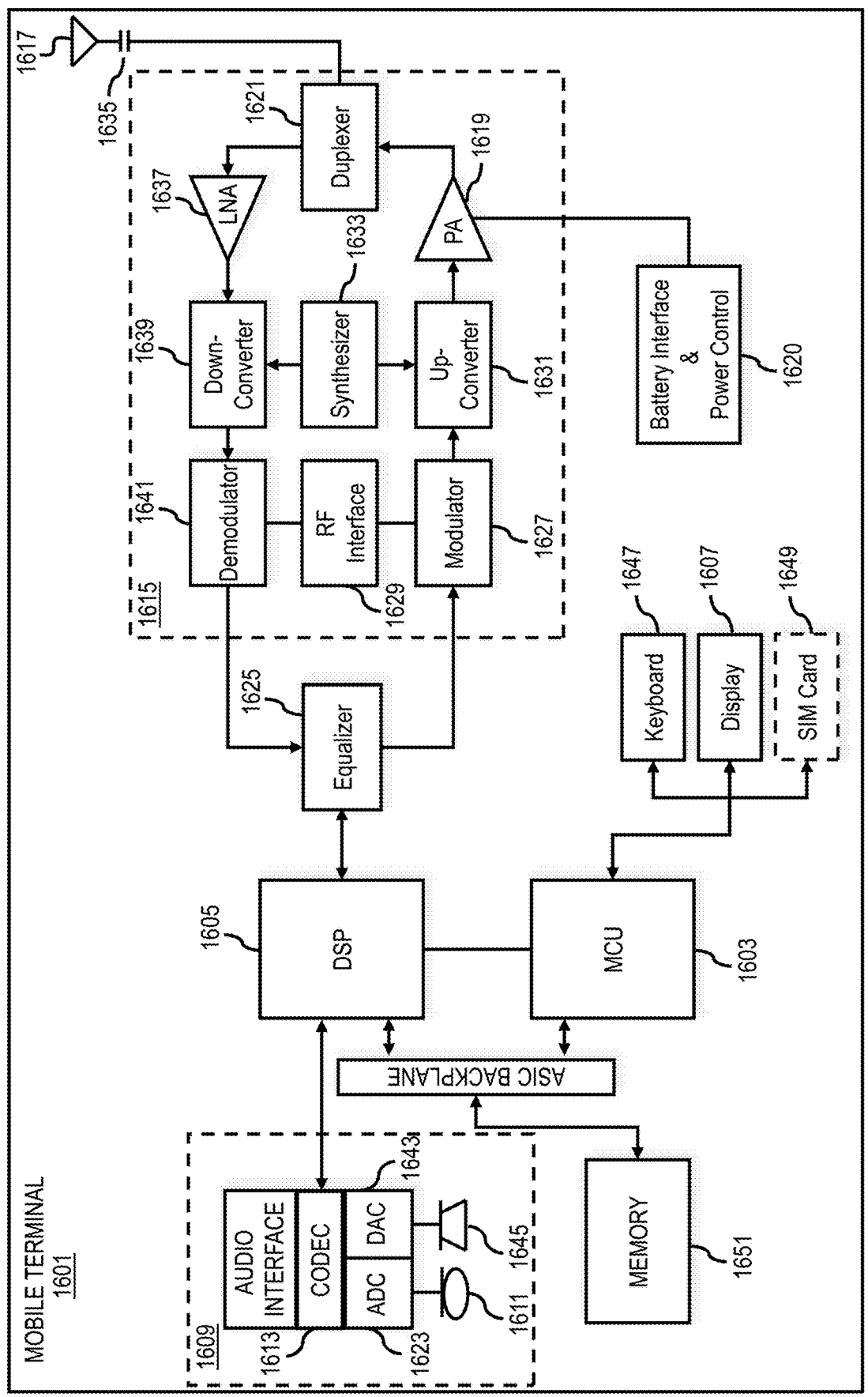
FIG. 16 is a diagram of a mobile terminal or device (e.g., handset) that can be used to implement an embodiment.

FIG. 16 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile station functions that offer automatic contact matching. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile station 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile station 1601 to providing map-based dynamic location sampling. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the station. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile station 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1651 may be, but not limited to, a single memory, CD, DVD, ROM, RAM, EEPROM, optical storage, or any other non-volatile or non-transitory storage medium capable of storing digital data.

An optionally incorporated SIM card 1649 carries, for instance, important information, such as the cellular phone number, the carrier supplying service, subscription details, and security information. The SIM card 1649 serves primarily to identify the mobile station 1601 on a radio network. The card 1649 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
calculating an estimated time of arrival at an end node of a road segment from a beginning node of the road segment based on historical traversal time data for the road segment, wherein the historical traversal time data has a normal distribution;
determining a sampling rate for a location sensor of a vehicle traveling the road segment based on the estimated time of arrival and geometry information of the road segment, wherein the sampling rate is determined based on a z-score of a designated percentage of the normal distribution to determine that the vehicle is on the road segment and has not traveled beyond the end node of the road segment based on the historical traversal data for the road segment; and
dynamically configuring the location sensor to operate to collect location data using the sampling rate.

2. The method of claim 1, further comprising:
determining a mean time of arrival, a standard deviation of a time of arrival, or a combination thereof for the historical traversal time data,
wherein the estimated time of arrival is based on the mean time of arrival, the standard deviation, or a combination thereof.

3. The method of claim 1, further comprising:
determining a time interval, contextual data, or a combination thereof associated with the vehicle traveling the road segment,
wherein the historical traversal time data corresponds to the time interval, the contextual data, or a combination thereof.

4. The method of claim 3, wherein the contextual data includes traffic data, weather data, or a combination thereof for the road segment.

5. The method of claim 1, further comprising:
adjusting the estimated time of arrival, the historical traversal time data, or a combination thereof based on contextual data associated with the vehicle traveling the road segment.

6. The method of claim 1, wherein the configuring of the location sensor to collect location data using the sampling rate comprises:
- determining a sampling time occurring before the estimated time of arrival based on the sampling rate; and
- initiating a capture of a geolocation signal by the location sensor at the sampling time,
- wherein the location data includes the geolocation signal.

7. The method of claim 6, wherein the geolocation signal is a usable geolocation signal, and wherein the usable geolocation signal is a map-matched location report with an uncertainty value satisfying a threshold value.

8. The method of claim 1, wherein the geometry information of the road segment includes one or more intersections within a proximity threshold of the beginning node and the end node of the road segment, and wherein the sampling rate for the location sensor is a dynamic sampling rate that increases nearby the one or more intersections or decreases in portions of the road segment that are farther from the one or more intersections.

9. The method of claim 1, further comprising:
- determining the sampling rate for the location sensor of the vehicle traveling the road segment based on a user-designated schedule, a user-defined interim location, or a combination thereof, wherein the user-designated schedule is based on the estimated time of arrival; and
- restoring to a default sampling rate upon determining that the user-defined interim location is farther than a distance threshold.

10. An apparatus comprising:
- at least one processor; and
- at least one memory including computer program code for one or more programs,
- the at least one memory and the computer program code configured to, with the at least one processor, cause the apparatus to perform at least the following,
  - calculate an estimated time of arrival at an end node of a road segment from a beginning node of the road segment based on historical traversal time data for the road segment, wherein the historical traversal time data has a normal distribution;
  - determine a sampling rate for a location sensor of a vehicle traveling the road segment based on the estimated time of arrival and geometry information of the road segment, wherein the sampling rate is determined based on a z-score of a designated percentage of the normal distribution to determine that the vehicle is on the road segment and has not traveled beyond the end node of the road segment based on the historical traversal data for the road segment; and
  - configure the location sensor dynamically to operate to collect location data using the sampling rate.

11. The apparatus of claim 10, wherein the apparatus is further caused to:
- determine a mean time of arrival, a standard deviation of a time of arrival, or a combination thereof for the historical traversal time data,
- wherein the estimated time of arrival is based on the mean time of arrival, the standard deviation, or a combination thereof.

12. The apparatus of claim 10, wherein the apparatus is further caused to:
- determine a time interval, contextual data, or a combination thereof associated with the vehicle traveling the road segment,
- wherein the historical traversal time data corresponds to the time interval, the contextual data, or a combination thereof.

13. The apparatus of claim 10, wherein the apparatus is further caused to:
- adjust the estimated time of arrival, the historical traversal time data, or a combination thereof based on contextual data associated with the vehicle traveling the road segment.

14. A non-transitory computer-readable storage medium, carrying one or more sequences of one or more instructions which, when executed by one or more processors, cause an apparatus to perform:
- calculating an estimated time of arrival at an end node of a road segment from a beginning node of the road segment based on historical traversal time data for the road segment, wherein the historical traversal time data has a normal distribution;
- determining a sampling rate for a location sensor of a vehicle traveling the road segment based on the estimated time of arrival and geometry information of the road segment, wherein the sampling rate is determined based on a z-score of a designated percentage of the normal distribution to determine that the vehicle is on the road segment and has not traveled beyond the end node of the road segment based on the historical traversal data for the road segment; and
- dynamically configuring the location sensor to operate to collect location data using the sampling rate.

15. The non-transitory computer-readable storage medium of claim 14, wherein the apparatus is caused to further perform:
- determining a mean time of arrival, a standard deviation of a time of arrival, or a combination thereof for the historical traversal time data,
- wherein the estimated time of arrival is based on the mean time of arrival, the standard deviation, or a combination thereof.

16. The non-transitory computer-readable storage medium of claim 14, wherein the apparatus is caused to further perform:
- determining a time interval, contextual data, or a combination thereof associated with the vehicle traveling the road segment,
- wherein the historical traversal time data corresponds to the time interval, the contextual data, or a combination thereof.

17. The non-transitory computer-readable storage medium of claim 14, wherein the apparatus is caused to further perform:
- adjusting the estimated time of arrival, the historical traversal time data, or a combination thereof based on contextual data associated with the vehicle traveling the road segment.

* * * * *